(12) United States Patent
Hayama et al.

(10) Patent No.: US 10,167,978 B2
(45) Date of Patent: Jan. 1, 2019

(54) DISPLACEMENT CONTROL VALVE

(71) Applicant: EAGLE INDUSTRY CO., LTD., Minato-ku, Tokyo (JP)

(72) Inventors: Masahiro Hayama, Tokyo (JP); Hideki Higashidozono, Tokyo (JP); Masayuki Futakuchi, Tokyo (JP); Kohei Fukudome, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 18 days.

(21) Appl. No.: 15/529,061

(22) PCT Filed: Dec. 21, 2015

(86) PCT No.: PCT/JP2015/085608
§ 371 (c)(1),
(2) Date: May 23, 2017

(87) PCT Pub. No.: WO2016/104390
PCT Pub. Date: Jun. 30, 2016

(65) Prior Publication Data
US 2017/0284562 A1 Oct. 5, 2017

(30) Foreign Application Priority Data
Dec. 25, 2014 (JP) .................. 2014-263015

(51) Int. Cl.
*F16K 47/06* (2006.01)
*F16K 51/00* (2006.01)
(Continued)

(52) U.S. Cl.
CPC .......... *F16K 47/06* (2013.01); *F04B 27/1009* (2013.01); *F04B 27/1804* (2013.01);
(Continued)

(58) Field of Classification Search
CPC .......... F16K 47/00; F16K 47/02; F16K 47/04; F16K 47/06; F16K 47/10; F16K 47/12;
(Continued)

(56) References Cited

U.S. PATENT DOCUMENTS 3,469,591 A * 9/1969 Odendahl ............... F16K 47/06
137/14
7,832,653 B2 * 11/2010 Yukimoto ............... F16K 47/04
236/92 B
(Continued)

FOREIGN PATENT DOCUMENTS

| JP | H11166635 A | 6/1999 |
|---|---|---|
| JP | 2001263529 A | 9/2001 |
| JP | 2003301773 A | 10/2003 |

OTHER PUBLICATIONS

International Search Report (ISR) dated Mar. 15, 2016, issued for International application No. PCT/JP2015/085608.

*Primary Examiner* — Ian Paquette
(74) *Attorney, Agent, or Firm* — Law Office of Katsuhiro Arai

(57) ABSTRACT

A displacement control valve includes a valve housing, a valve element fitted in a guide passage of the valve housing, and a solenoid for driving the valve element to open and close it, a tapered portion is provided at one of an outer peripheral surface of the valve element and a guide surface of the guide passage, and a spiral groove is provided in the other, wherein the tapered portion is set such that a gap between the valve element and the guide passage is larger toward the low-pressure side than on the high-pressure side, and the tapered portion and the spiral groove are provided such that a starting point of the tapered portion is located within the region of the spiral groove in the entire range between the starting point and the ending point of the stroke of the valve element.

3 Claims, 5 Drawing Sheets

(51) Int. Cl.
*F16K 31/06* (2006.01)
*F16K 27/02* (2006.01)
*F04B 27/10* (2006.01)
*F04B 27/18* (2006.01)
*F04B 39/10* (2006.01)
*F16K 41/00* (2006.01)
*F16K 47/12* (2006.01)
*F16K 25/04* (2006.01)
*G05D 16/20* (2006.01)

(52) U.S. Cl.
CPC ............... *F04B 39/10* (2013.01); *F16K 25/04* (2013.01); *F16K 27/029* (2013.01); *F16K 31/06* (2013.01); *F16K 31/0675* (2013.01); *F16K 41/00* (2013.01); *F16K 47/12* (2013.01); *F16K 51/00* (2013.01); *G05D 16/2013* (2013.01); *F04B 2027/185* (2013.01); *F04B 2027/1813* (2013.01); *F04B 2027/1827* (2013.01); *F04B 2027/1845* (2013.01); *F04B 2027/1854* (2013.01)

(58) Field of Classification Search
CPC ..... F16K 1/06; F16K 1/34; F16K 1/36; F16K 1/38; F16K 1/40; F16K 1/485; F16K 1/54; F16K 39/02; F16K 39/022; F16K 27/029; F16K 31/0675; F16K 41/00; F16K 25/04; F16K 31/06; F16K 51/00; F04B 39/10; F04B 27/1804; F04B 27/1009; F04B 2027/1845; F04B 2027/185; F04B 2027/1813; F04B 2027/1854; F04B 2027/1827; G05D 16/2013
USPC .................................................. 251/129.15
See application file for complete search history.

(56) References Cited

U.S. PATENT DOCUMENTS

2004/0065860 A1    4/2004  Bircann
2012/0313029 A1* 12/2012  Karl ....................... B60T 8/363
    251/333

\* cited by examiner

DISPLACEMENT CONTROL VALVE

This application is the U.S. National Phase under 35 U.S.C. § 371 of International Application PCT/JP2015/085608, filed Dec. 21, 2015, which claims priority to Japanese Patent Application No. 2014-263015, filed Dec. 25, 2014. The International Application was published under PCT Article 21(2) in a language other than English.

TECHNICAL FIELD

The present invention relates to displacement control valves for variably controlling the flow rate or the pressure of working fluids, and for example, relates to displacement control valves for controlling the discharge rate of variable displacement compressors or the like used in air-conditioning systems in automobiles or the like, according to pressure load.

BACKGROUND ART

A displacement control value controls, for example, a control fluid working in a variable displacement compressor, and a discharge fluid supplied by opening and closing a valve. Iron powder or aluminum powder resulting from wear during operation in the variable displacement compressor is mixed in the discharge fluid. The powder has a diameter of about 10 μm, and thus adheres to sliding surfaces of the displacement control value therebetween. When a valve rod constituting one of the sliding surfaces is inclined with respect to an axis, a gap on the inclined side becomes narrower. The powder gets into the narrower portion, thus preventing the valve rod from operating according to setting. For this problem, improvement is required.

To this end, there is a known invention as shown in FIG. 3, for example, in which, in a solenoid valve including a bobbin 50 housed in a case 51 and wound with a coil 52, a core 53 provided at a central portion of the bobbin 50, constituting a magnetic circuit, a movable iron core 54 that is attracted toward the core by passing current through the coil 52, a rod 55 integrally joined to the movable iron core 54, a spool valve 56 pressed by the rod 55, a housing 57 that guides the spool valve 56, and a feedback chamber 58 formed by the spool valve 56 and a step of the housing 57, aligning grooves 59a and 59b are provided in the inner periphery of the housing 57 between an input port 59 and the feedback chamber 58 and between the feedback chamber 58 and the core 53, respectively, to align the spool valve 56 (Hereinafter, this invention is referred to as "Conventional Art 1." See Patent Document 1, for example.).

There is also a known invention as shown in FIG. 4 in which, in a displacement control valve including a valve element 66 for opening and closing a control passage, a fixed iron core 61 for driving the valve element 66 to open and close it, a drive unit 60 including a tube 62, a plunger 63, a solenoid 64, and others, a rod guide hole 67 extending across the valve element 66 side and the drive unit 60 side, and a rod 68 slidably inserted through the rod guide hole 67 to operatively connect the valve element 66 and the drive unit 60, a gap between an outer peripheral surface of the rod 68 and an inner peripheral surface of the rod guide hole 67 is made larger on the low-pressure side than on the high-pressure side partially or entirely in a rod longitudinal direction so that foreign matter that has entered a space between the rod 68 and the rod guide hole 67 can be easily discharged (Hereinafter, this invention is referred to as "Conventional Art 2." See Patent Document 2, FIG. 1, for example.).

Further, there is a known invention as shown in FIG. 5 in which, in a displacement control valve as in Conventional Art 2, a spiral groove 69 extending partially or entirely in a rod longitudinal direction is provided in an outer peripheral surface of a rod 68 or/and an inner peripheral surface of a rod guide hole 67 so that foreign matter that has entered a space between the rod 68 and the rod guide hole 67 can be easily discharged (Hereinafter, this invention is referred to as "Conventional Art 3." See Patent Document 2, FIG. 2, for example.).

CITATION LIST

Patent Document

Patent Document 1: JP 2001-263529 A
Patent Document 2: JP 2003-301773 A

SUMMARY OF THE INVENTION

Problem to be Solved by the Invention

However, Conventional Art 1, in which the aligning grooves 59a and 59b improve the aligning characteristics of the spool valve 56, has a problem of a poor function of discharging foreign matter that has entered a space between the inner periphery of the housing 57 and the outer periphery of the spool valve 56.

Conventional Art 2, in which the gap between the outer peripheral surface of the rod 68 or/and the inner peripheral surface of the rod guide hole 67 is made larger on the low-pressure side than on the high-pressure side, improves the function of discharging foreign matter that has entered the space between the rod 68 and the rod guide hole 67, but has a problem of lacking the function of aligning the rod 68.

Conventional Art 3, in which the spiral groove 69 is provided in the outer peripheral surface of the rod 68 and the inner peripheral surface of the rod guide hole 67, improves the function of discharging foreign matter that has entered the space between the rod 68 and the rod guide hole 67 and the function of aligning the rod 68 to a certain extent, but simply providing the spiral groove 69 has a limit.

The present invention has been made to solve the problems of the above conventional arts, and has an object of providing a displacement control valve remarkably improved in the function of discharging foreign matter entering a space between an outer peripheral surface of a valve element and an inner peripheral surface of the body of the displacement control valve and the function of aligning the valve element.

Means for Solving Problem

To attain the above object, a displacement control valve according to an aspect of the present invention is a displacement control valve including a valve housing, a valve element fitted in a guide passage of the valve housing, for opening and closing a control passage, and a solenoid for driving the valve element to open and close the valve element, in which a tapered portion is provided at one of an outer peripheral surface of the valve element and a guide surface of the guide passage, and a spiral groove is provided in the other, the tapered portion is set so that a gap between the outer peripheral surface of the valve element and the guide surface of the guide passage is larger toward a low-pressure side than on a high-pressure side, and the tapered portion and the spiral groove are provided so that a starting point of the tapered portion is located within a region of the spiral groove in an entire range between a starting point and an ending point of a stroke of the valve element.

According to this aspect, a fluid flows through the spiral groove of the valve element, so that the aligning function of the valve element with respect to the valve housing is improved, and the operating characteristics of the valve element can be improved, and also formation of a narrower gap portion is prevented, and thus impalpable powder can be prevented from getting stuck. Therefore, clearance between sliding portions can be set small, and the amount of leakage can be reduced, contributing to an improvement in the efficiency of a system such as a car air-conditioner. Further, responsiveness is improved, so that the control speed of a system such as a car air-conditioner can be increased.

Further, impalpable powder that has entered the gap between the outer peripheral surface of the valve element and the guide surface of the guide passage is forced out immediately through the spiral groove, thus being discharged reliably to the low-pressure side without accumulating halfway, so that the valve element can be prevented from increasing its sliding resistance. As a result, the resistance of the displacement control valve to foreign matter is improved, and the displacement control valve maintaining stable operating characteristics can be provided.

Effect of the Invention

The present invention achieves the following outstanding effects.

(1) A fluid flows through the spiral groove of the valve element, so that the aligning function of the valve element with respect to the valve housing is improved, and the operating characteristics of the valve element can be improved, and also formation of a narrower gap portion is prevented, and thus impalpable powder can be prevented from getting stuck. Therefore, clearance between the sliding portions can be set small, and the amount of leakage can be reduced, contributing to an improvement in the efficiency of a system such as a car air-conditioner. Further, responsiveness is improved, so that the control speed of a system such as a car air-conditioner can be increased.

(2) Impalpable powder that has entered the gap between the outer peripheral surface of the valve element and the guide surface of the guide passage is forced out immediately through the spiral groove, thus being discharged reliably to the low-pressure side without accumulating halfway, so that the valve element can be prevented from increasing its sliding resistance. As a result, the resistance of the displacement control valve to foreign matter is improved, and the displacement control valve maintaining stable operating characteristics can be provided.

DESCRIPTION OF EMBODIMENT

Hereinafter with reference to the drawings, forms for implementing this invention will be described illustratively based on an embodiment. However, the dimensions, materials, shapes, relative arrangements, and others of components described in the embodiment are not intended to limit the scope of the present invention only to them unless otherwise described explicitly.

First Embodiment

Figure 1:
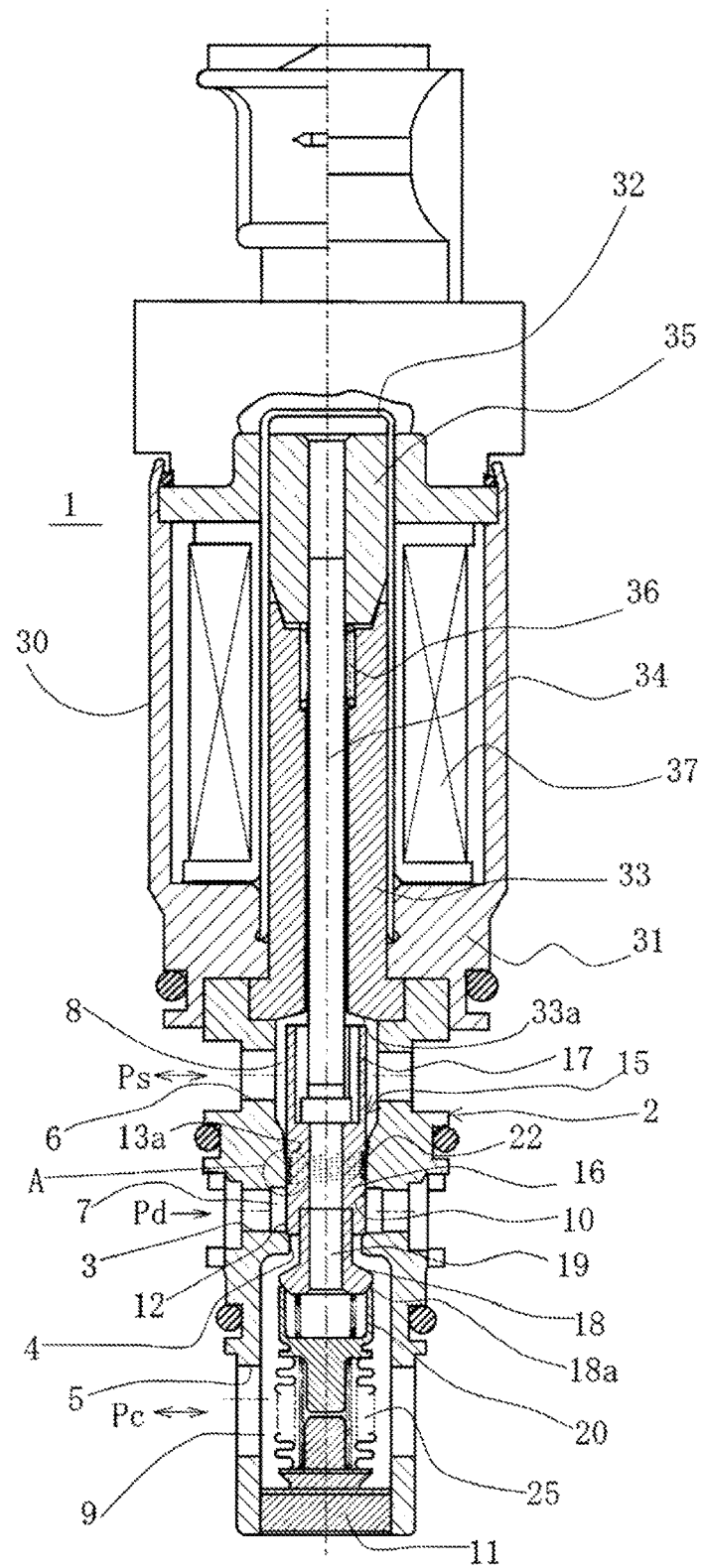
FIG. 1 is a cross-sectional view showing a displacement control valve in its entirety according to a first embodiment of the present invention.
Figure 2:
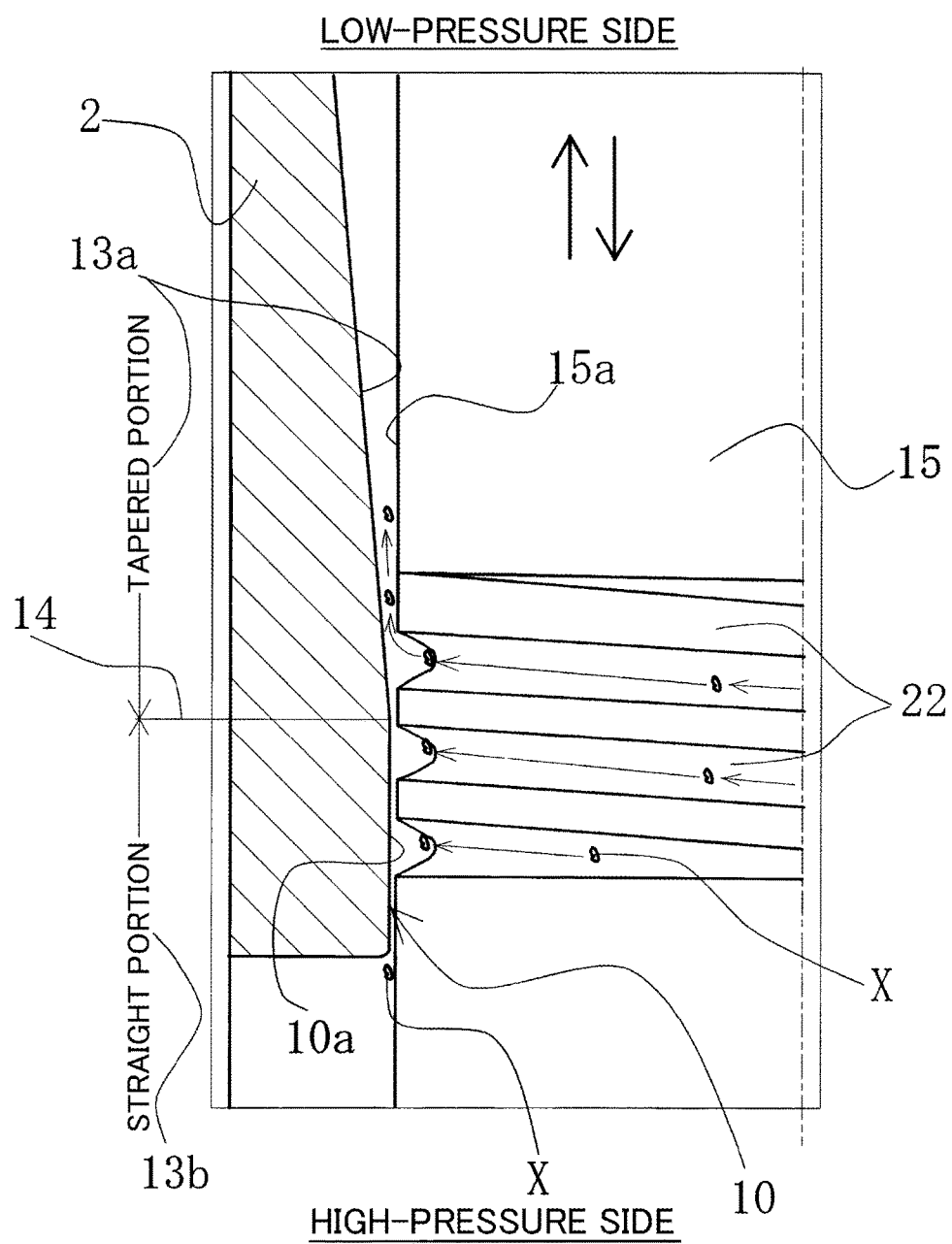
FIG. 2 is an enlarged view showing details of a portion A in FIG. 1, in which a valve element is shown not cross-sectioned.
Figure 3:
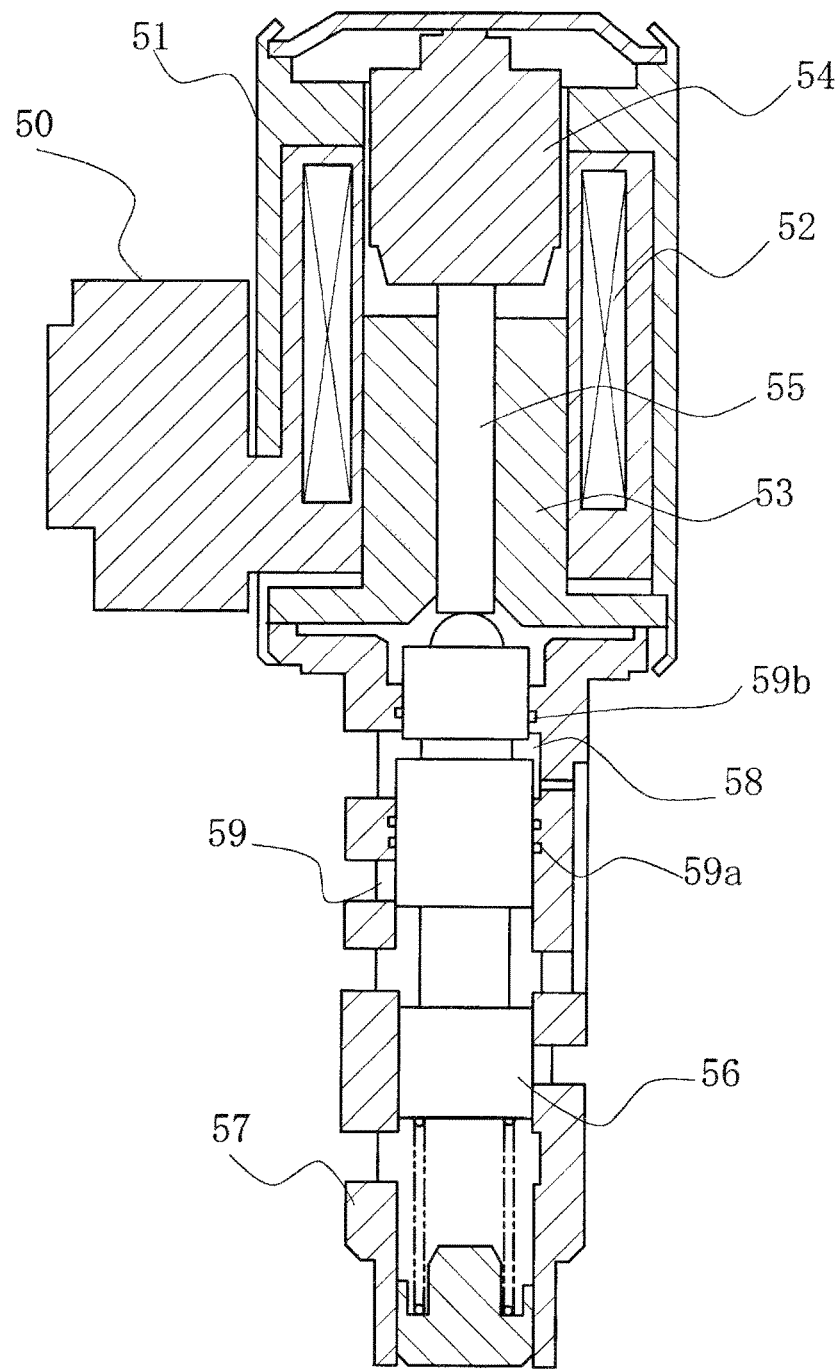
FIG. 3 is a diagram illustrating Conventional Art 1.
Figure 4:
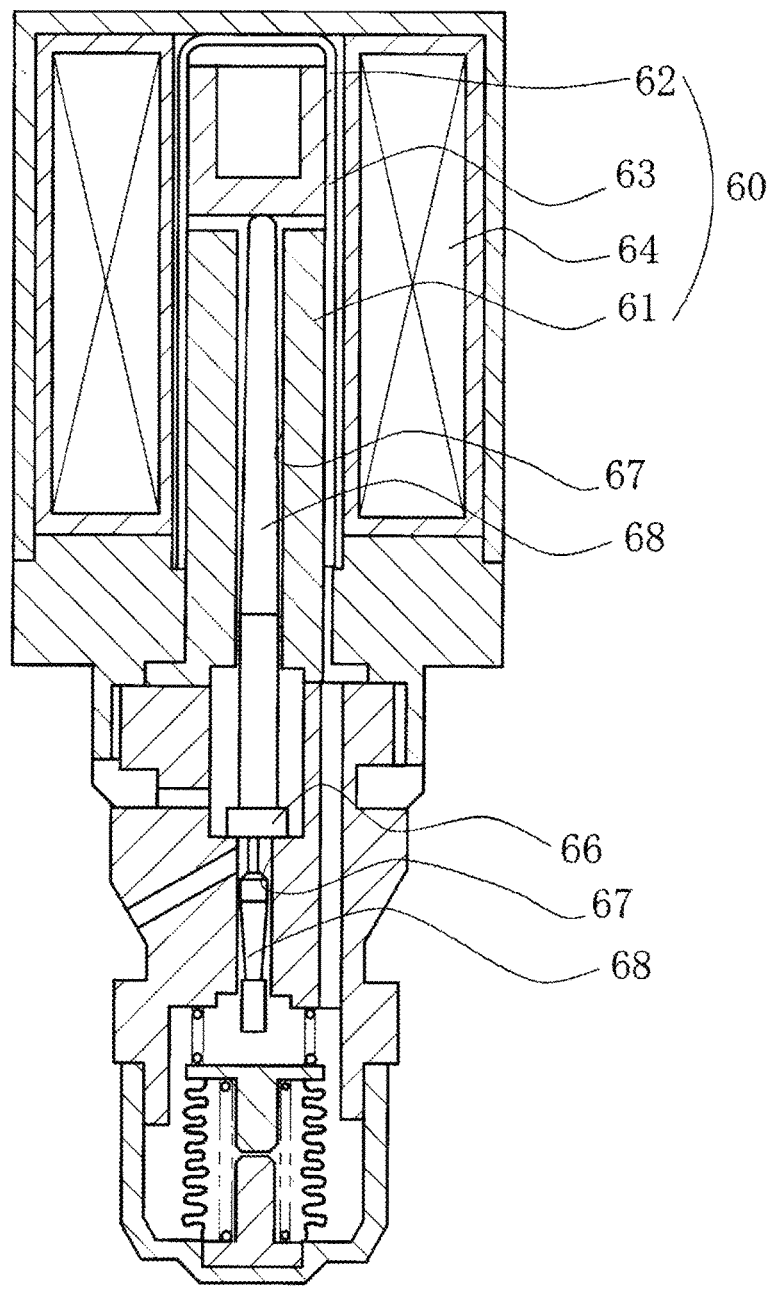
FIG. 4 is a diagram illustrating Conventional Art 2.
Figure 5:
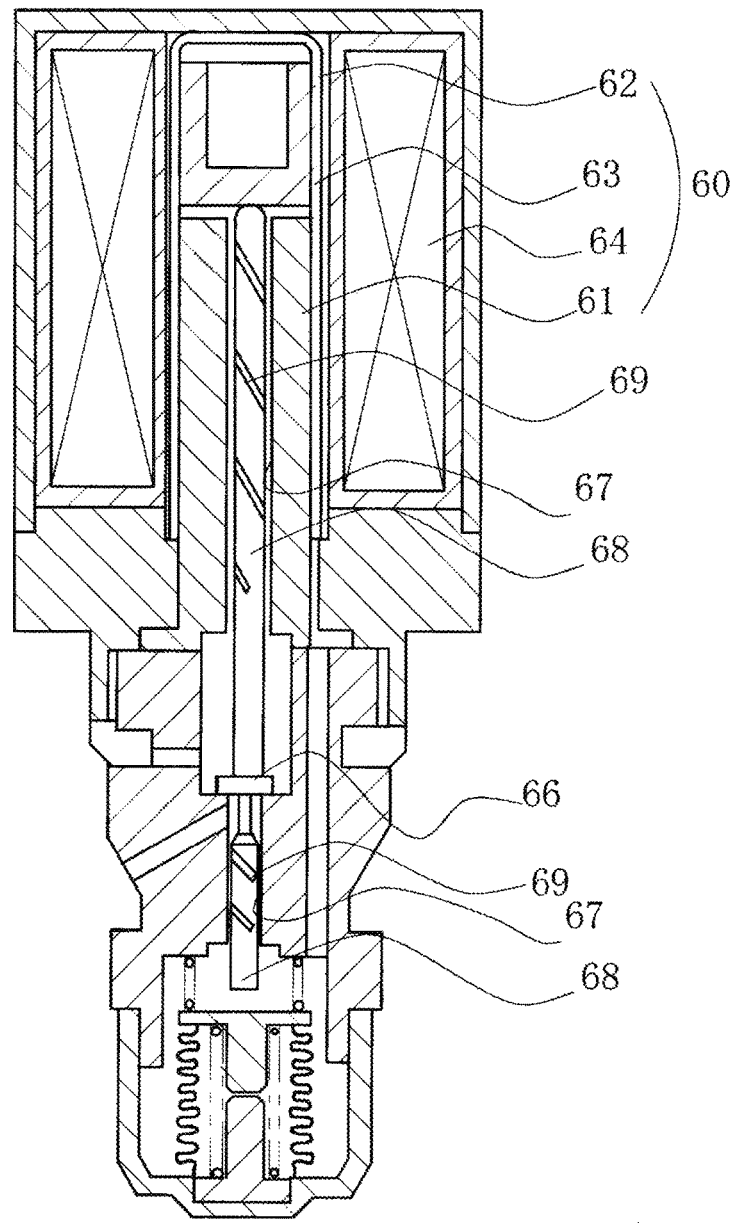
FIG. 5 is a diagram illustrating Conventional Art 3.

With reference to FIGS. 1 and 2, a displacement control valve according to a first embodiment of the present invention will be described.

A displacement control valve 1 includes a valve housing 2 formed with a metal material or a resin material, a valve element 15 disposed reciprocably in the valve housing 2, a pressure-sensitive element 25 biasing the valve element 15 in one direction, a solenoid 30 as a drive unit connected to the valve housing 2, for exerting an electromagnetic driving force on the valve element 15, and others.

The solenoid 30 includes a casing 31 formed with a metal material coupled to the valve housing 2, a sleeve 32 closed at one end, a cylindrical fixed iron core 33 disposed inside of the casing 31 and the sleeve 32, a driving rod 34 reciprocable in the inside of the fixed iron core 33 and coupled to the valve element 15 at its distal end, a movable iron core 35 fixed to the other end of the driving rod 34, a coil spring 36 biasing the movable iron core 35 in a direction to open the valve element 15, an exciting coil 37 wound on the outside of the sleeve 32 via a bobbin, an end member 38 provided in such a manner as to seal an upper end opening of the casing 31, and others.

The valve housing 2 includes ports 3, 4, and 5 serving as a discharge-side passage, ports 6 and 5 serving as a suction-side passage together with a communicating path 19 in the valve element 15, a first valve chest 7 formed in the middle of the discharge-side passage, a second valve chest 8 formed in the middle of the suction-side passage, a third valve chest 9 formed in the discharge-side passage and the suction-side passage, a guide passage 10 for guiding the valve element 15, and others. A partition adjustment member 11 demarcating the third valve chest 9 is pressed in the valve housing 2.

In the present invention, the discharge-side passage and/or the suction-side passage are sometimes referred to as a "control passage."

The port 5 and the third valve chest 9 are formed to serve as a part of the discharge-side passage and the suction-side passage. The port 4 forms a valve hole that allows the first valve chest 7 and the third valve chest 9 to communicate, and allows the valve element 15 to be inserted therethrough (passes the valve element 15 while providing a gap through which a fluid flows).

In the first valve chest 7, a valve seat 12 on which a first valve section 16 of the valve element 15 described below sits is formed at an edge of the port (valve hole) 4. In the second valve chest 8, a seat 33a on which a second valve section 17 of the valve element 15 described below sits is formed at an end of the fixed iron core 33.

A symbol Ps represents the suction pressure of a variable displacement compressor controlled, Pd the discharge pressure, and Pc the control chamber pressure.

The valve element 15 is formed in a substantially cylindrical shape, and includes the first valve section 16 on one side, the second valve section 17 on the other side, a third valve section 18 coupled opposite to the second valve section 17 across the first valve section 16 by retrofitting, the communicating path 19 extending therethrough from the second valve section 17 to the third valve section 18 in the axial direction to serve as the suction-side passage, and others.

The third valve section 18 has a shape expanded from a contracted state from the first valve chest 7 to the third valve chest 9, and is formed with a tapered engaging face 18a facing an adapter 20 at an expanded portion.

The pressure-sensitive element 25 is disposed in the third valve chest 9, and operates to exert a biasing force in a direction to open the first valve section 16 by its extension (expansion) and to weaken the biasing force exerted on the first valve section 16 by contracting with surrounding pressure increase.

As shown in FIG. 2, an outer peripheral surface 15a of the valve element 15 is slidably engaged with a guide surface 10a of the guide passage 10 in the valve housing 2.

A gap between the outer peripheral surface 15a of the valve element 15 and the guide surface 10a of the guide passage 10 is in a range of about 0.02 to 0.08 mm, a range that allows impalpable powder X to pass. The dimensions of the gap are set to provide some clearance to the valve element 15 within a range that prevents the inclination of the axis of the valve element 15 from becoming excessive so that the surfaces can closely contact each other when the valve element 15 is seated on the valve seat 12 to be closed.

At the same time, the gap is designed to have dimensions that allow sealing between the first valve chest 7 and the second valve chest 8 depending on the pressure difference between the discharge pressure Pd of a discharge fluid in the first valve chest 7 (high-pressure side) and the suction pressure Ps in the second valve chest 8 (low-pressure side).

Specifically, the gap has dimensions within a range that limits the discharge fluid under the discharge pressure Pd to a minute leak. A minute leak does not pose a problem much in terms of displacement control.

In order to reduce sliding resistance of the valve element 15 during operation, an O-ring for sealing or the like is not provided in the gap between the valve element 15 and the guide passage 10 in this configuration.

The valve element 15 is separated from or brought into contact with the valve seat 12 to open or close it to cause the fluid at the discharge pressure Pd of a high pressure to flow into a crank chamber (control chamber) of the variable displacement compressor not shown as a fluid at the control chamber pressure Pc to control the interior of the crank chamber.

In FIG. 2, a spiral groove 22 is provided in the outer peripheral surface 15a of the valve element 15 facing the guide passage 10.

A tapered portion 13a is provided at the guide surface 10a of the guide passage 10.

The tapered portion 13a is set so that the gap between the outer peripheral surface 15a of the valve element 15 and the inner peripheral surface of the guide passage 10 is larger toward the low-pressure side than on the high-pressure side.

The tapered portion 13a and the spiral groove 22 are provided so that an axial starting point 14 of the tapered portion 13a is located within the axial region of the spiral groove 22 in the entire range between the starting point and the ending point of the stroke of the valve element 15.

In the case of FIG. 2, the spiral groove 22 is provided in the outer peripheral surface 15a of the valve element 15, and the tapered portion 13a is provided at the guide surface 10a of the guide passage 10. On the contrary, a spiral groove may be provided in the guide surface 10a of the guide passage 10, and a tapered portion may be provided at the outer peripheral surface 15a of the valve element 15. In this case, they are provided so that an axial starting point of the tapered portion at the outer peripheral surface 15a of the valve element 15 is located within the axial region of the spiral groove in the guide surface 10a of the guide passage 10 in the entire range between the starting point and the ending point of the stroke of the valve element 15.

In the displacement control valve 1 configured as described above, the discharge fluid at the discharge pressure Pd flowing into the first valve chest 7 flows through the port 4 to the third valve chest 9 when the valve element 15 is separated from the valve seat 12 to be opened. At this time, the discharge pressure Pd is a high pressure, so that a minute amount of fluid also flows toward the gap between the outer peripheral surface 15a of the valve element 15 and the guide passage 10. However, since the length of a straight portion 13b of the guide passage 10 is within several millimeters, and the pressure of the fluid passing through the gap is high, impalpable powder X contained in the fluid can be prevented from adhering to the sliding surfaces and getting stuck between them.

Then, since the spiral groove 22 is provided in the outer peripheral surface 15a of the valve element 15 facing the guide passage 10, the impalpable powder X entering from the high-pressure side toward the low-pressure side axially along the valve element 15 inevitably crosses the spiral groove 22 in some region on the way, and thus falls into the spiral groove 22. The impalpable powder X that has fallen into the spiral groove 22 is discharged to the low-pressure side by the flow of a fluid flowing through the spiral groove 22. At the same time, the valve element 15 is aligned by the fluid flowing through the spiral groove 22.

At that time, since the tapered portion 13a is provided at the guide surface 10a of the guide passage 10 from an axially middle portion of the spiral groove 22, the impalpable powder X is discharged more reliably.

Specifically, the pressure of the fluid in the spiral groove 22 facing the straight portion 13b is relatively high because at the straight portion 13b, the gap is small, and the discharge pressure Pd is acting without being reduced. On the other hand, at the tapered portion 13a, the gap gradually increases toward the low-pressure side, and the pressure of the fluid is gradually reduced due to loss, thus forming a pressure gradient in which the pressure in the spiral groove 22 facing the tapered portion 13a decreases toward the low-pressure side. Therefore, the impalpable powder X that has fallen into the spiral groove facing the straight portion 13b is forced out immediately without accumulating into the spiral groove 22 facing the tapered portion 13a having the minus pressure gradient, together with the high-pressure fluid, to be discharged to the low-pressure side. Thus, the impalpable powder X is reliably discharged without being accumulated by getting stuck halfway through the gap between the outer peripheral surface 15a of the valve element 15 and the guide passage 10, or the like.

The displacement control valve in the first embodiment, in which, as described above, the spiral groove 22 is provided in the outer peripheral surface 15a of the valve element 15, the tapered portion 13a is provided at the guide surface 10a of the guide passage 10, the tapered portion 13a is set so that the gap between the outer peripheral surface 15a of the valve element 15 and the guide surface 10a of the guide passage 10 is larger toward the low-pressure side than on the high-pressure side, and the tapered portion 13a and the spiral groove 22 are provided so that the starting point 14 of the tapered portion 13a is located within the region of the spiral groove 22 in the entire range between the starting point and the ending point of the stroke of the valve element 15, thus achieves the following outstanding effects.

(1) A fluid flows through the spiral groove 22 of the valve element 15, so that the aligning function of the valve element 15 with respect to the valve housing 2 is improved, and the operating characteristics of the valve element can be improved, and also formation of a narrower gap portion is prevented, and thus the impalpable powder X can be prevented from getting stuck. Therefore, clearance between the sliding portions can be set small, and the amount of leakage can be reduced, contributing to an improvement in the efficiency of a system such as a car air-conditioner. Further, responsiveness is improved, so that the control speed of a system such as a car air-conditioner can be increased.

(2) The impalpable powder X that has entered the gap between the outer peripheral surface 15a of the valve element 15 and the guide surface 10a of the guide passage 10 is forced out immediately through the spiral groove 22, thus being discharged reliably to the low-pressure side without accumulating halfway, so that the valve element 15 can be prevented from increasing its sliding resistance. As a result, the resistance of the displacement control valve to foreign matter is improved, and the displacement control valve maintaining stable operating characteristics can be provided.

Although the embodiment of the present invention has been described above with the drawings, specific configurations are not limited to the embodiment. Any changes and additions made without departing from the scope of the present invention are included in the present invention.

For example, the above embodiment has been described on the case where the spiral groove 22 is provided in the outer peripheral surface 15a of the valve element 15, and the tapered portion 13a is provided at the guide surface 10a of the guide passage 10, which is not limiting. A spiral groove may be provided in the guide surface 10a of the guide passage 10, and a tapered portion may be provided at the outer peripheral surface 15a of the valve element 15. In this case, an axial starting point of the tapered portion at the outer peripheral surface 15a of the valve element 15 only needs to be provided in such a manner as to be located within the axial region of the spiral groove in the guide surface 10a of the guide passage 10 in the entire range between the starting point and the ending point of the stroke of the valve element 15.

REFERENCE SIGN LIST 1 displacement control valve
2 valve housing
3, 4, 5 port
6 port
7 first valve chest
8 second valve chest
9 third valve chest
10 guide passage
10a guide surface
11 partition adjustment member
12 valve seat
13a tapered portion
13b straight portion
14 axial starting point of the tapered portion
15 valve element
15a outer peripheral surface
16 first valve section
17 second valve section
18 third valve section
18a tapered engaging face
19 communicating path
20 adapter
22 spiral groove
25 pressure-sensitive element
30 solenoid
31 casing
32 sleeve
33 fixed iron core
33a seat
34 driving rod
35 movable iron core
36 coil spring
37 exciting coil
38 end member
Pd discharge pressure
Ps suction pressure
Pc control chamber pressure
X impalpable powder

The invention claimed is:

1. A displacement control valve comprising a valve housing, a valve element fitted in a guide passage of the valve housing, for opening and closing a control passage, and a solenoid for driving the valve element to open and close the valve element, wherein
the control passage comprises at least a discharge-side port as a discharge-side passage or a suction-side port as a suction-side passage provided in the valve housing,
the guide passage is provided between the discharge-side port and the suction-side port,
the valve element comprises a first valve section on one side and a second valve section on the other side, for opening and closing the discharge-side port and the suction-side port,
a tapered portion is provided at one of an outer peripheral surface of the valve element facing the guide passage and a guide surface of the guide passage, and a spiral groove is provided in the other,
the tapered portion is set so that a gap between the outer peripheral surface of the valve element and the guide surface of the guide passage is larger toward a low-pressure side than on a high-pressure side, and
the tapered portion and the spiral groove are provided so that a starting point of the tapered portion is located within a region of the spiral groove in an entire range between a starting point and an ending point of a stroke of the valve element.

2. A displacement control valve according to claim 1, wherein the tapered portion is provided to the guide surface of the guide passage, and the spiral groove is provided to the outer peripheral surface of the valve element.

3. A displacement control valve according to claim 1, wherein the spiral groove is continuous from an end of the region of the spiral groove to the other end thereof.

* * * * *